United States Patent
Abernethy, Jr. et al.

(10) Patent No.: US 7,783,747 B2
(45) Date of Patent: Aug. 24, 2010

(54) METHOD AND APPARATUS FOR IMPROVING CLUSTER PERFORMANCE THROUGH MINIMIZATION OF METHOD VARIATION

(75) Inventors: Michael Negley Abernethy, Jr., Pflugerville, TX (US); Travis M. Grigsby, Austin, TX (US); Syed-Muasir Khalil, Austin, TX (US); Truong-an Hoan Thai, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 11/459,455

(22) Filed: Jul. 24, 2006

(65) Prior Publication Data

US 2008/0021988 A1    Jan. 24, 2008

(51) Int. Cl.
*G06F 15/173* (2006.01)
(52) U.S. Cl. .................. 709/224; 709/223; 709/225; 709/226
(58) Field of Classification Search .......... 709/223–226
See application file for complete search history.

(56) References Cited

U.S. PATENT DOCUMENTS

| | | | |
|---|---|---|---|
| 6,832,272 B2 | 12/2004 | Hirakawa et al. | |
| 2002/0105924 A1* | 8/2002 | Yang et al. | 370/329 |
| 2002/0188768 A1 | 12/2002 | Hirakawa et al. | |
| 2002/0198924 A1 | 12/2002 | Akashi et al. | |
| 2003/0014507 A1 | 1/2003 | Bertram et al. | |
| 2004/0103194 A1* | 5/2004 | Islam et al. | 709/225 |
| 2005/0088976 A1 | 4/2005 | Chafle et al. | |
| 2006/0224725 A1* | 10/2006 | Bali et al. | 709/224 |
| 2006/0277090 A1* | 12/2006 | Bollenbeck et al. | 705/9 |
| 2008/0016214 A1* | 1/2008 | Galluzzo et al. | 709/226 |

FOREIGN PATENT DOCUMENTS

JP    62233873    10/1987

* cited by examiner

*Primary Examiner*—Rupal D Dharia
*Assistant Examiner*—Loi Tran
(74) *Attorney, Agent, or Firm*—Yee & Associates, P.C.; David A. Mims, Jr.

(57) ABSTRACT

A computer implemented method, apparatus, and computer usable program code for managing a server cluster. The process identifies a plurality of average method call durations corresponding to calls to a plurality of methods associated with an application on the server cluster to form a plurality of identified average method call durations. The process groups the plurality of methods based on the plurality of identified average method call durations to form a plurality of grouped methods. Each method in the plurality of grouped methods is executed by a particular cluster member in the server cluster. The manner in which the plurality of grouped cluster members is grouped reduces a coefficient of variation on each cluster member in the server cluster. The process executes a method in a selected cluster member associated with the method in response to receiving a call for the method.

20 Claims, 8 Drawing Sheets

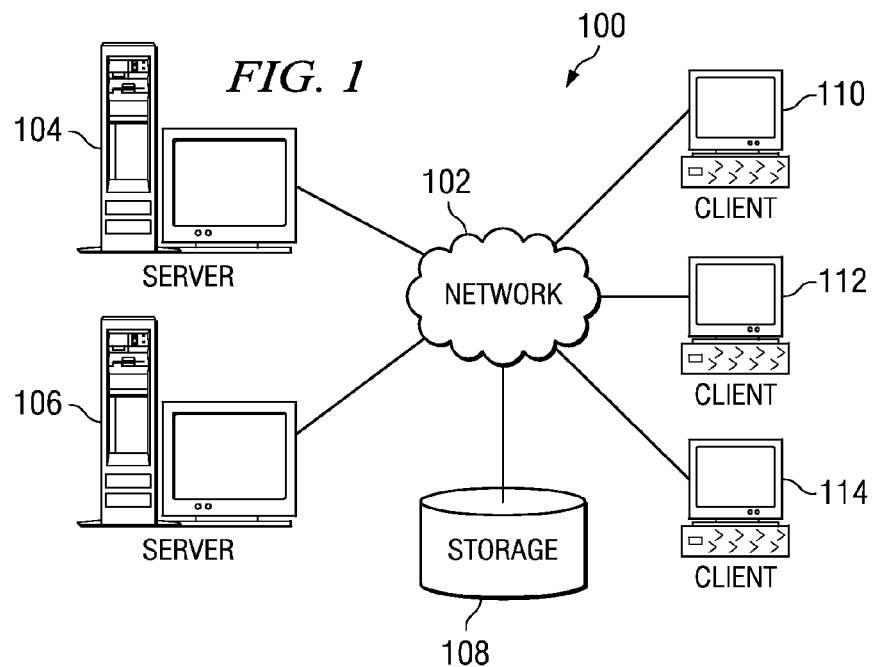
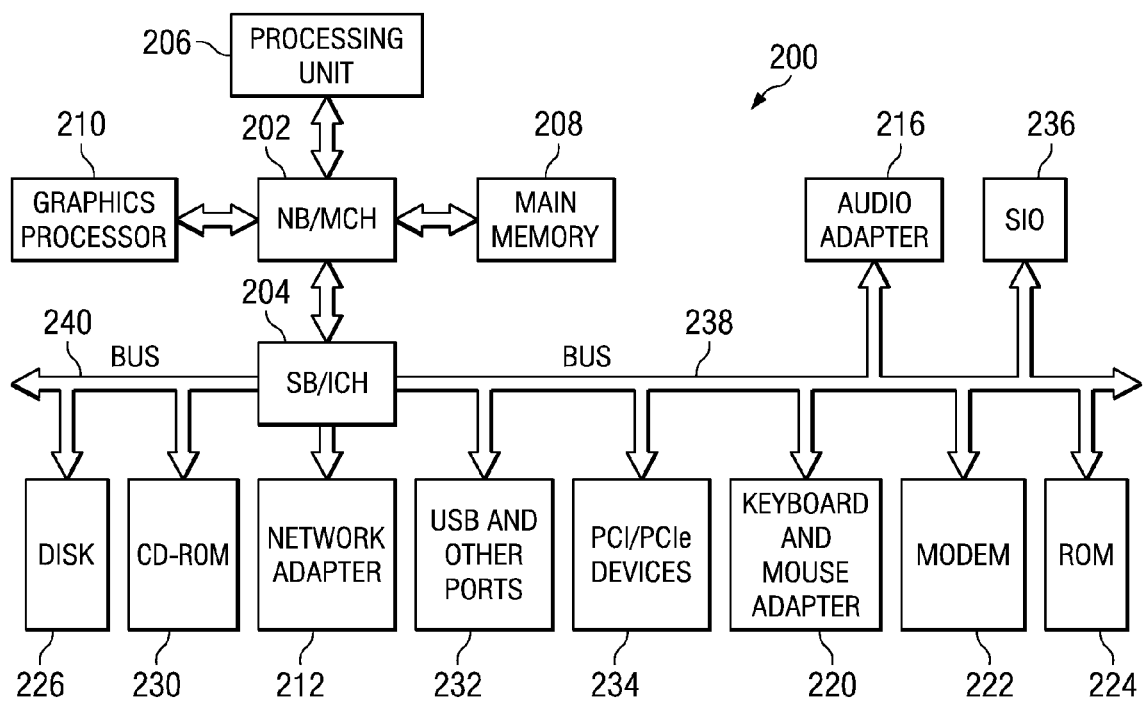

$$\text{FIG. 5A} \quad \left\{ \text{WAIT TIME} = \dfrac{\dfrac{p^{\sqrt{2c+1}}}{1-p} \times \dfrac{\left(\dfrac{c_i}{\sqrt{c}}\right)^2 + c_p^2}{2}}{R} \right\} 502$$

$$\text{FIG. 5B} \quad \left\{ c_v = \dfrac{\sigma}{\mu} \right\} 504$$

| | | | | | | | | | | | | | | |
|---|---|---|---|---|---|---|---|---|---|---|---|---|---|---|
| METHOD CALLS/ SECOND | 86 | 87 | 88 | 89 | 90 | 91 | 92 | 93 | 94 | 95 | 96 | 97 | 98 | 99 | 99.5 | 99.9 |
| UTIL RATE OF APPSERVER | 86.0% | 87.0% | 88.0% | 89.0% | 90.0% | 91.0% | 92.0% | 93.0% | 94.0% | 95.0% | 96.0% | 97.0% | 98.0% | 99.0% | 99.5% | 99.9% |
| METHOD CALL BACKUP | 2.84 | 3.17 | 3.55 | 4.01 | 4.56 | 5.23 | 6.08 | 7.18 | 8.65 | 10.72 | 13.82 | 19.01 | 29.41 | 60.64 | 123.13 | 623.13 |
| WAIT TIME (SECONDS)/ METHOD CALL | 0.03 | 0.04 | 0.04 | 0.05 | 0.05 | 0.06 | 0.07 | 0.08 | 0.09 | 0.11 | 0.14 | 0.20 | 0.30 | 0.61 | 1.24 | 6.24 |

| PERCENT UTILIZATION | 0.95 | | | | | | | | | | | | | | | | | | | |
|---|---|---|---|---|---|---|---|---|---|---|---|---|---|---|---|---|---|---|---|---|
| Cp (COEFFICIENT OF VARIATION) | 0.05 | 0.1 | 0.15 | 0.2 | 0.25 | 0.3 | 0.35 | 0.4 | 0.45 | 0.5 | 0.55 | 0.6 | 0.65 | 0.7 | 0.75 | 0.8 | 0.85 | 0.90 | 0.95 | 1 |
| METHOD CALL BACKUP | 2.16 | 2.23 | 2.34 | 2.49 | 2.68 | 2.92 | 3.19 | 3.52 | 3.85 | 4.29 | 4.74 | 5.23 | 5.77 | 6.34 | 6.97 | 7.53 | 8.34 | 9.09 | 9.88 | 10.72 |
| WAIT TIME (SECONDS)/ METHOD CALL | 0.022 | 0.022 | 0.023 | 0.025 | 0.027 | 0.029 | 0.032 | 0.035 | 0.039 | 0.043 | 0.048 | 0.053 | 0.058 | 0.064 | 0.070 | 0.077 | 0.084 | 0.091 | 0.099 | 0.106 |

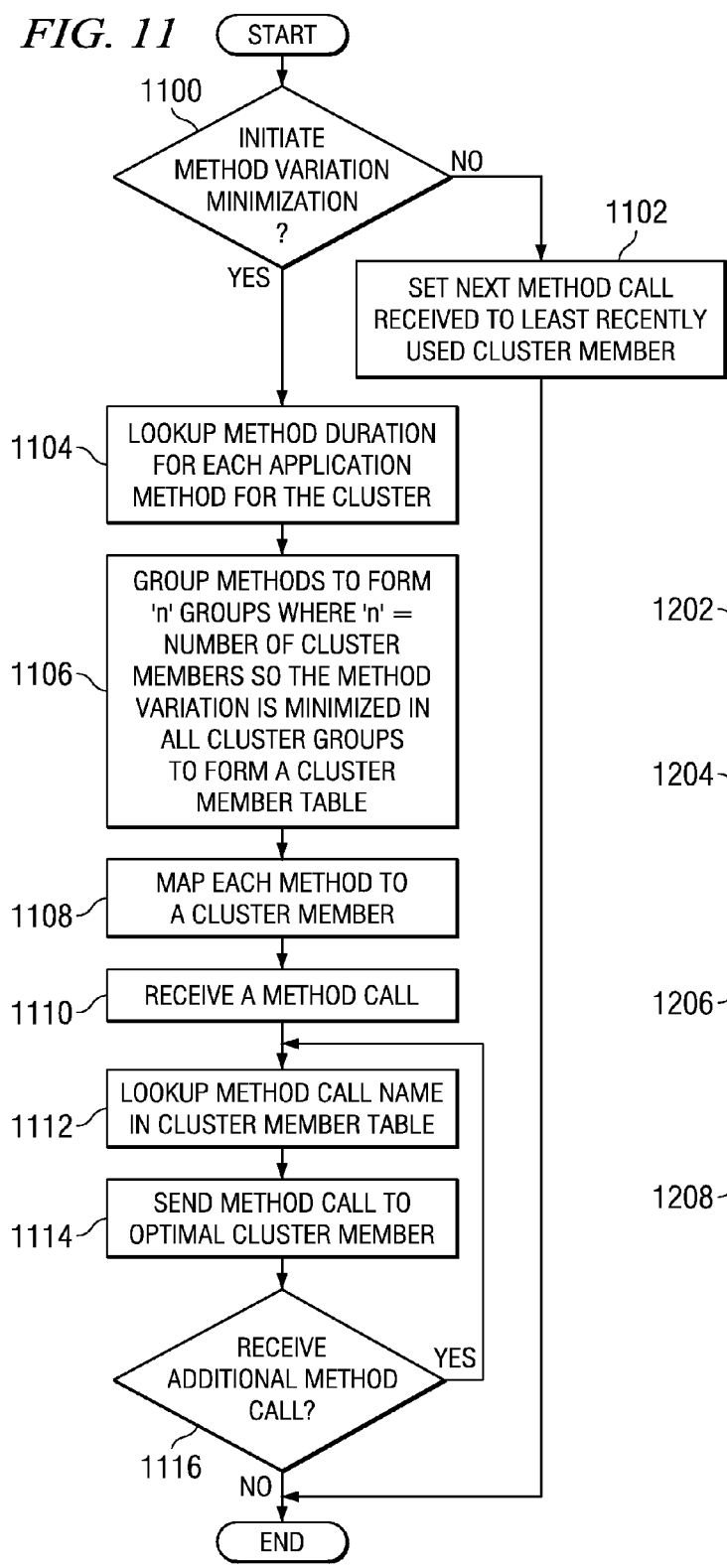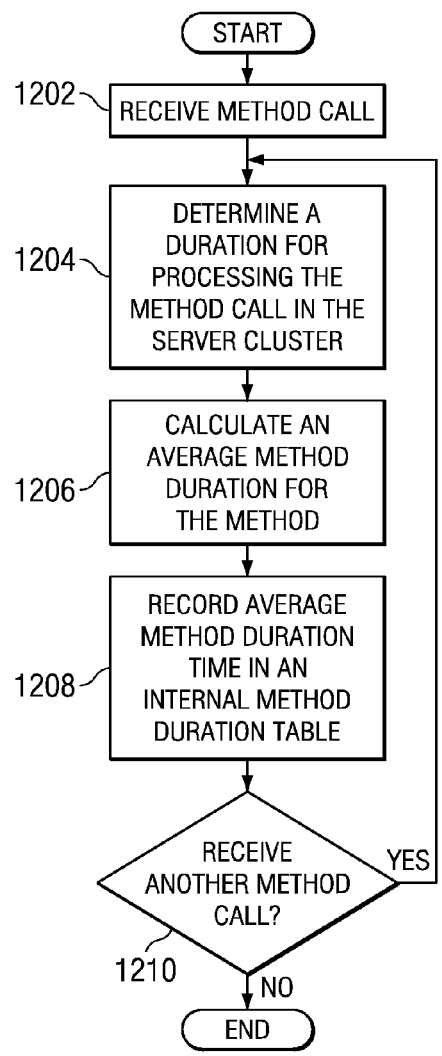

METHOD AND APPARATUS FOR IMPROVING CLUSTER PERFORMANCE THROUGH MINIMIZATION OF METHOD VARIATION

BACKGROUND OF THE INVENTION

1. Field of the Invention

The present application relates generally to an improved data processing system and in particular, to a computer implemented method, apparatus, and computer usable program code for managing a computer cluster. Still more particularly, the present application relates to a computer implemented method, apparatus, and computer usable program code for improving processing performance in an application server cluster.

2. Description of the Related Art

Currently, application servers in a server cluster environment are utilized to increase the efficiency of user access to an application by allowing multiple application servers to handle application method calls simultaneously. A server cluster is a group of computers tasked to perform a particular job, such as running an application or a service. A server cluster can be considered a virtual computer because all the cluster members are performing the same tasks. Users or clients of the application or service do not know that there is more than one physical computer providing access to the service or application. The users or clients see only a single entity. As used herein, a cluster member is a server that is part of the larger server cluster.

A server cluster is required to have at least two cluster members, although a server cluster can include any number of cluster members in excess of two cluster members. However, the number of cluster members utilized in a server cluster typically does not exceed two hundred and fifty-six (256) cluster members. It is the norm in current practice for a server cluster to include from two to six cluster members.

A cluster member may or may not be located on the same physical machine as one or more other cluster members. In current practice, each cluster member is typically located on a separate physical machine.

The physical machine that the cluster member is located on is referred to as an application server. An application server is a server that runs application server software. Application server software is the software that provides the necessary means for establishing client and server applications, application services, and related application content.

For example, a server cluster could run an email application. In this example, the email application software is located on one or more application servers in the server cluster. Each time a user on a client requests access to the user's email account, the client sends a method call via the email application software to gain access to the user's email account associated with the email application running on the server cluster.

A work load manager (WLM) is a software component in a server cluster that manages the workload of application method calls. The work load manager receives method calls from one or more clients and routes those method calls to one or more cluster members for processing. An application method call is a call on a method or an application request from a client to access or utilize one or more functionalities provided by the application software.

Current work load managers in a server cluster use a weighted-round robin approach to manage incoming method calls from clients. The round robin approach keeps track of which servers have recently been asked to handle a method call. In the round robin approach, the work load manager maintains a list of cluster members. The work load manager sends each newly received method call to the next cluster member on the list of cluster members. In other words, a newly received method call is sent to the least recently used cluster member in the cluster.

For example, if a server cluster includes four cluster members and cluster member 1, cluster member 2, and cluster member 3 have just been asked to handle a method call, the work load manager will route the next incoming method call, method call D, to cluster member 4. Continuing the example, if another subsequent method call, method call E, is received, method call E, will be sent to cluster member 1, which is now the least recently used cluster member because cluster member 4 was used to process method call D.

However, using this weighted-round robin approach for routing method calls to cluster members can lead to performance degradation when the server cluster is under a heavy workload. A heavy workload can occur when the number of application requests received from one or more clients begins to approach a maximum number of application requests that a server cluster is capable of handling.

SUMMARY OF THE INVENTION

The illustrative embodiments provide a computer implemented method, apparatus, and computer usable program code for managing a server cluster. The process identifies a plurality of average method call durations corresponding to calls to a plurality of methods associated with an application on the server cluster to form a plurality of identified average method call durations. The process groups the plurality of methods based on the plurality of identified average method call durations to form a plurality of grouped methods. Each method in the plurality of grouped methods is executed by a particular cluster member in the server cluster. The manner in which the plurality of grouped cluster members is grouped reduces a coefficient of variation on each cluster member in the server cluster. The process executes a method in a selected cluster member associated with the method in response to receiving a call for the method in the plurality of grouped methods.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein FIG. 1 is a pictorial representation of a network of data processing systems in which illustrative embodiments may be implemented;

FIG. 2 is a block diagram of a data processing system in which illustrative embodiments may be implemented;

FIG. 5A is an example of queuing theory formulas in accordance with an illustrative embodiment;

FIG. 5B is an example of an equation for calculating a coefficient of variation in accordance with an illustrative embodiment;

FIG. 11 is a flowchart of an operation occurring when a work load manager receives a method call in accordance with an illustrative embodiment; and FIG. 12 is a flowchart of an operation occurring when a work load manager determines average method call duration in accordance with an illustrative embodiment.

DETAILED DESCRIPTION OF THE PREFERRED EMBODIMENT

Figure 3:
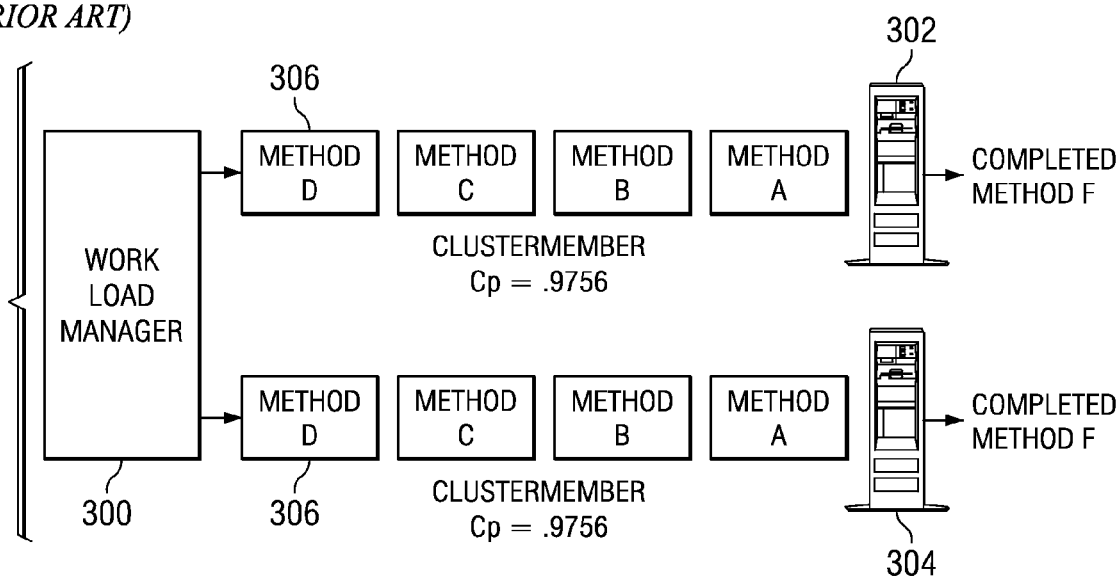
FIG. 3 is a block diagram of a usage pattern for a server cluster in which a prior art round-robin approach is implemented for routing application method calls to cluster members.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications parts 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Currently, application servers in a server cluster environment are utilized to increase the efficiency of user access to an application by allowing multiple application servers to handle application method calls simultaneously. A server cluster has two or more cluster members. Server clusters typically include two to six cluster members.

A cluster member may or may not be located on the same physical machine as one or more other cluster members. In current practice, each cluster member is typically located on a separate physical machine.

A work load manager (WLM) is a software component in a server cluster that manages the server cluster workload. The server cluster workload is made up of a plurality of application method calls received from one or more clients. An application method call is an application request from a client to access or utilize one or more functionalities provided by the application software.

Work load managers in the prior art use a weighted-round robin approach to manage the workload of application method calls in a server cluster.

Referring to FIG. 3, a block diagram of a usage pattern for a server cluster is depicted in which a prior art round-robin approach is implemented for routing application method calls to cluster members.

Work load manager 300 routes a newly received method call, such as method call D 306, to the next cluster member on the list in accordance with a round robin approach. This round robin approach keeps track of which cluster members, such as cluster member 302 and cluster member 304, have recently been asked to handle a method call.

In other words, a newly received method call is sent to the least recently used cluster member regardless of the identity of the method call. Thus, when method call D 306 is received, it may be sent to any cluster member that happens to be the least recently used cluster member.

However, using this weighted-round robin approach for routing method calls can lead to performance degradation when the server cluster is under a heavy workload. A server cluster is under a heavy workload when the number of method calls received per second begins to increase above a certain point and utilization of the cluster members in the server cluster reaches a certain percentage level. For example, a server cluster can be considered to be under a heavy workload when the server cluster members are processing method calls ninety-five (95) percent of the time. In other words, the server cluster is busy because the cluster members are constantly running.

Likewise, for example, a server cluster can be considered to be under a heavy workload when the server cluster is receiving ninety-six (96) percent of the maximum number of method calls the server cluster is capable of processing.

As the utilization of cluster members increases and/or the number of method calls received per second increased, the wait time or duration for processing each method call begins to increase.

Figure 4:
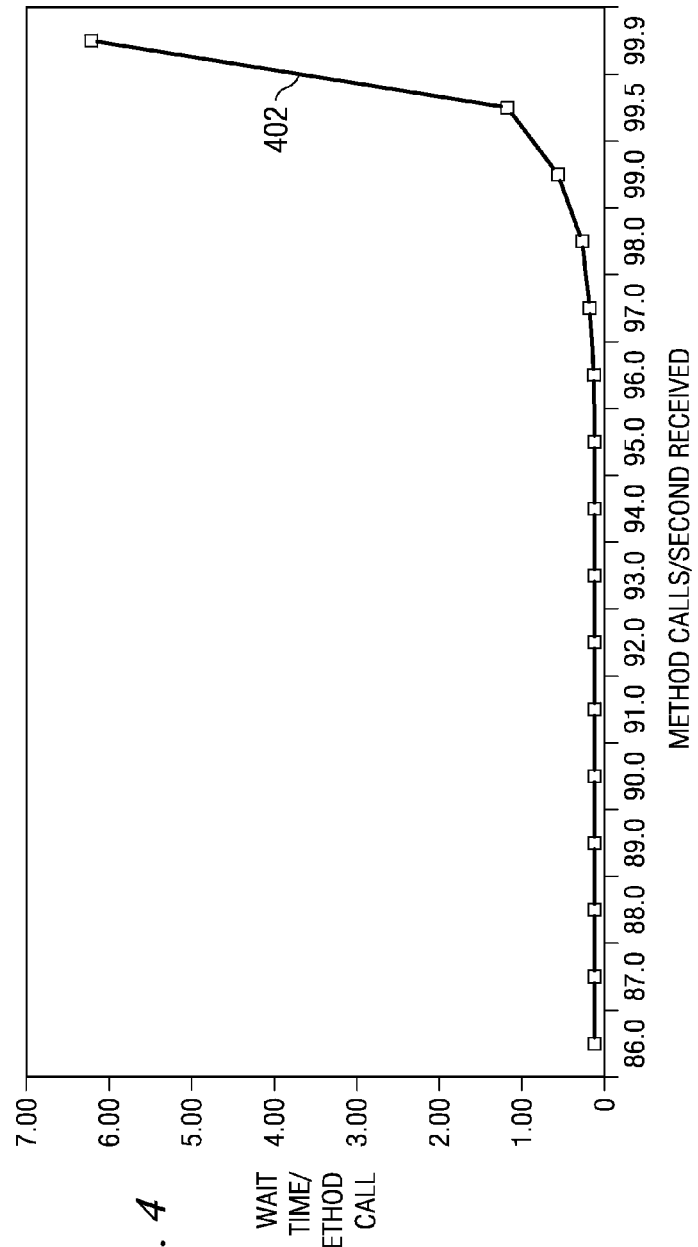
FIG. 4 is a graph diagram illustrating the wait time per method call where a work load manager implements a prior art round robin scheduler.

Turning now to FIG. 4, a graph diagram is depicted illustrating the wait time per method call where a work load manager implements a prior art round robin scheduler. Referring to line 402, as the application server cluster receives a greater number of method calls per second, the wait time for processing each method call begins to grow exponentially. In other words, as the number of method calls received per second 404 and the utilization rate of the application server cluster 406 increases, the delay in processing due to backup of method calls 408 waiting to be processed and the wait time per method call 410 for processing the method call at the application server cluster increases dramatically. For example, a method call will wait 0.07 seconds for processing when the application server cluster is ninety-five (95) percent utilized, but the same method call will wait over six (6) seconds when the application server cluster is utilized at ninety-nine point nine (99.9) percent.

The illustrative embodiments recognize that the prior art round-robin approach to routing application method calls is not optimized when a cluster is under heavy utilization. Improvements in the overall performance of application server clusters can be improved by minimizing the variation of application method call processing across the server cluster when the server cluster is under a heavy workload.

An application on an application server cluster has a given number of possible functionalities, services, or tasks that the application can perform. A user can access or utilize these functionalities, services, or tasks, by making an application method call on the application server cluster. Thus, a given number of application method calls representing each of the possible functionalities, services, or tasks on a given application are possible.

For each possible application method call, a work load manager can determine an average process time or duration for processing the method call on the application server cluster. An average or mean value is a statistical norm, intermediate value, or expected value. An average is calculated by adding a set of values to get a total. The total is then divided by the number of values in the set to obtain the average or intermediate value represented by the set of numbers. For example, if the duration for processing a given method call is taken three times and the values are 0.09, 0.06, and 0.03, the three values can be added to obtain a total of 0.18. This total is divided by three to obtain the average value of 0.06. Thus, the average duration for processing method call A is 0.06. However, the actual time for processing method call A varied from 0.03 seconds, which is half the average, to 0.09 seconds. Thus, the actual durations for two of the method call durations deviated by 0.03 seconds when compared to the average results.

The illustrative embodiments recognize that if the deviation of the actual durations for processing a set of method calls from the average or expected duration for processing the method calls are minimized or reduced, the application server cluster performance will be improved. In other words, processing of method calls can be optimized over the entire server cluster if the actual duration for processing each application method call is closer to the average or expected duration for processing the method call.

The illustrative embodiments provide a computer implemented method, apparatus, and computer program product for managing a server cluster and improving cluster performance by minimizing the variation in method call durations across the server cluster. The work load manager identifies a plurality of average method call durations corresponding to calls to a plurality of methods associated with an application on the server cluster to form a plurality of identified average method call durations. The work load manager maintains a record of the average method call durations for each method call in the plurality of method calls associated with the application running in the application server cluster.

The process groups the plurality of methods based on the plurality of identified average method call durations to form a plurality of grouped methods. The plurality of grouped methods includes one or more groups of methods. Each group of methods in the plurality of grouped methods includes one or more method call identifiers. A method call identifier identifies a call for a given method in the plurality of grouped methods.

Each method in the plurality of grouped methods is executed by a particular cluster member in the server cluster corresponding to the group of methods associated with each method. A group of methods in the plurality of grouped methods is generated for each cluster member in the set of cluster members on the server. As used herein, a set of cluster members includes a single cluster member, as well as two or more cluster members. The set of cluster members can include all the cluster members in the server cluster or a subset of the cluster members in the server cluster. In other words, if a server cluster has three cluster members, a group of methods can be generated for a set of cluster members that includes only two of the three cluster members, rather than all three of the cluster members.

The manner in which the plurality of grouped cluster members is grouped reduces a coefficient of variation on each cluster member in the server cluster. The process executes a method in a selected cluster member associated with the method in response to receiving a call for the method in the plurality of grouped methods.

In other words, when a client calls a method on the application running in the cluster, the work load manger will route the method call to a pre-determined cluster member mapped to the method call so that the coefficient of variation across the cluster members will remain minimized.

Statistical data and queuing theory algorithms show that in order to optimize performance in a system with multiple servers and queues, minimization of the coefficient of variation within each cluster member can be used to improve performance of processing method calls in the entire system.

Referring to FIG. 5A, an example of a queuing theory formula is shown in accordance with an illustrative embodiment. Queuing theory can be used to minimize method call wait time in a cluster member on a server cluster. One or more cluster members are implemented on a data processing system, such as data processing system 200 in FIG. 2.

Queuing theory examines the variables that determine how long a method call will wait in a process on a cluster. In the illustrative formula shown at 502, wait time for a method call in a cluster environment can be determined. In 502, p is the utilization rate of the cluster members; c is the number of cluster members processing method calls in the queue; Ci is the coefficient of variation of the arrival rate of incoming method calls; Cp is the coefficient of variation of the duration for processing a method call; and R is the flow rate of the cluster member. A flow rate refers to the number of method calls the cluster member is handling or processing per second.

FIG. 5B is an example of an equation for calculating a coefficient of variation in accordance with an illustrative embodiment. The coefficient of variation is a measure of the dispersion of a probability distribution. The coefficient of variation is defined as the ratio of the standard deviation to the mean. The coefficient of variation can be shown as an equation such as equation 504. In other words, the coefficient of variation measures the deviations of the actual results compared to the average result. The coefficient of variation permits someone to measure the deviation between two distinctly different populations.

In effect, the coefficient of variation can be used to measure the variation in a population with different mean values. The coefficient of variation is used to measure the variation in the duration for processing a method call in a cluster environment.

A Poissan distribution can be used to describe the assumed coefficient of variation. In effect, a Poissan distribution describes the coefficient of variation for randomly occurring events within a given time period and a known average over that time period. Thus, the interval between method calls arriving at a given cluster member can be described as having a Poissan distribution because there is no pattern for their arrival. In other words, the actual rate at which users will actually send method calls to a cluster cannot be predicted. However, the average arrival rate of method calls sent by users can be determined over a given time period. In addition, the duration of a method call will have a Poissan distribution because the duration of each method call processing is random.

A Poissan distribution defines the coefficient of variation when random events occur over a measured amount of time. A Poissan distribution describes random events, such as the incoming rate of method calls and/or the duration of processing method calls in a server cluster as a distribution ranging from zero (0) to one (1.0). When a Poissan distribution reaches a value one (1.0) the occurrence of the random event can no longer be predicted. Thus, a Poissan distribution states that the coefficient of variation will be one (1.0) for a system where the average arrival rate of method calls over a specified time period is known but the actual arrival rate of the method calls are random during that time period.

The coefficient of variation utilized to determine the amount of variation of the duration of processing a method call from the average duration for processing the method call in the server cluster. As a server cluster utilization rate increases due to an increasing number of method calls received from users, the coefficient of variation can be decreased in order to minimize the variation of method duration across the server cluster. In this manner, the duration for processing method calls across the server cluster can likewise be reduced to improve the server cluster processing efficiency and reduce method call wait time in the server cluster.

Figure 6:
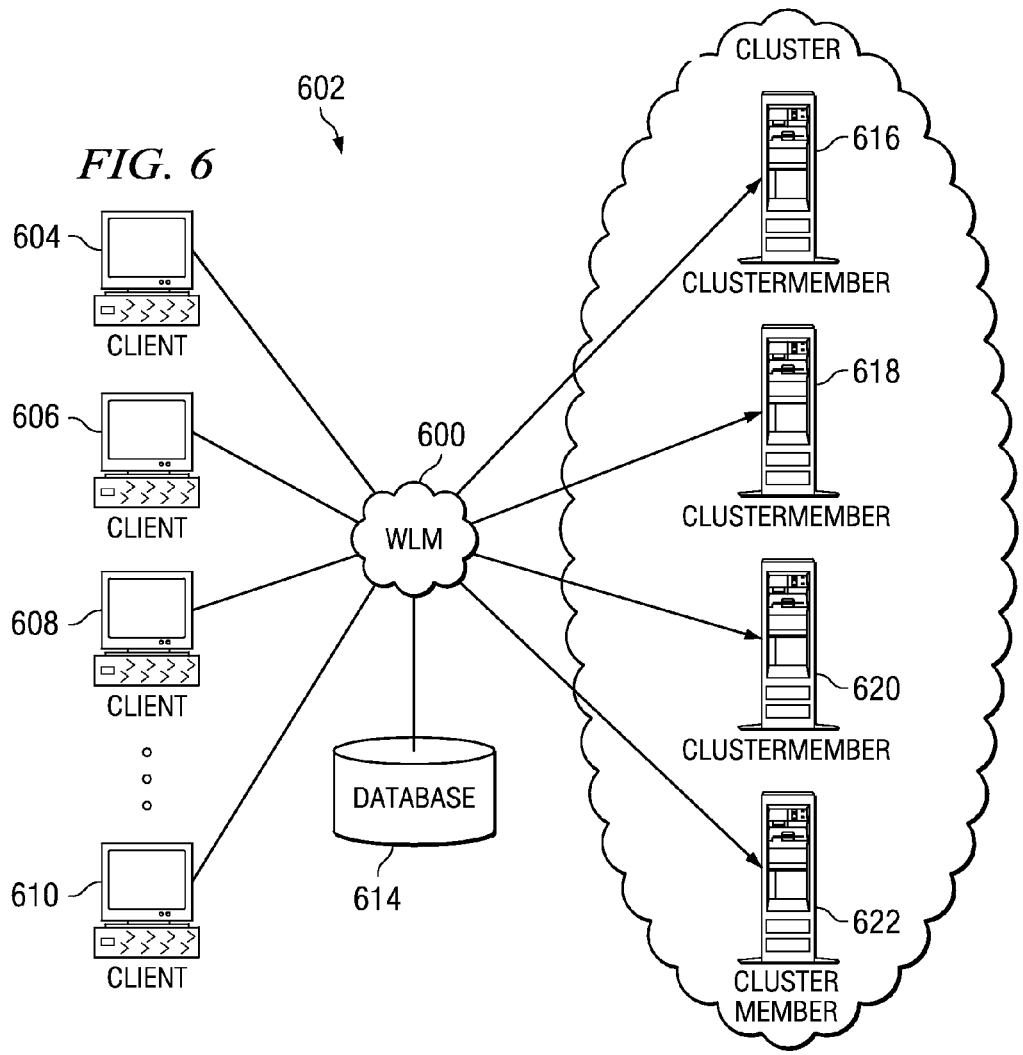
FIG. 6 is a block diagram of a server cluster environment including a work load manager in accordance with an illustrative embodiment.

FIG. 6 is a block diagram of a server cluster environment including a work load manager in accordance with an illustrative embodiment. Work load manager 600 is a software application running on a server, such as server 104 or 106 in FIG. 1. Work load manager 600 is operating in cluster environment 602. Cluster environment 602 is a cluster environment including a server cluster and a set of clients.

Cluster environment 602 includes a set of clients, 604, 606, 608, and 610. Although this illustrative example depicts four clients, any number of clients can be utilized to send application method calls or application requests to work load manager 600 in accordance with the illustrative embodiments. Thus, a set of clients can include only a single client, as well as two or more clients.

Cluster environment 602 includes database 614. Database 614 is any known or available data storage device, including, but not limited to, a hard disk, read only memory (ROM), or a secondary storage. In this example, database 614 is a data storage unit such as storage 108 in FIG. 1.

Cluster environment 602 also includes a set of cluster members, 616, 618, 620, and 622. Cluster members are servers, such as servers 104 and 106 in FIG. 1.

Work load manager 600 records the amount of time it takes to process each received method call. These method call duration timings are stored in a data storage device, such as database 614. Work load manager average a set of duration timings for each method call associated with the application on the cluster server to generate an average duration for each method call.

Work load manager 600 makes a determination as to whether to route method calls to cluster members 616-622 using a round-robin approach or a method variation minimization approach. If work load manager 600 makes a determination to route method calls to cluster members 616-622 using a method variation minimization approach, work load manager 600 looks-up the average method duration for every method call associated with a given application running on cluster environment 602. The average method durations are stored in database 614.

Work load manager 600 uses an algorithm to group all the method calls for the application into two or more groups of method calls to form a set of method call groups. Work load manager 600 assigns each method call group to a different cluster member in the server cluster. In this illustrative example, a method call group is assigned to every cluster member in the server cluster, including each of cluster members 616-622.

Each method call group includes one or more method call identifiers. A method call identifier identifies a method call to be routed to a given cluster member associated with that method call group. In other words, all the method calls in a given method call group are mapped to the same server cluster. Whenever any method call corresponding to a method call mapped to a given cluster member is received, the method call is always routed to that mapped cluster member.

In accordance with this illustrative embodiment, a call for a method is mapped to a cluster member that corresponds to an optimum coefficient of variation for processing the method in the server cluster. An optimum coefficient of variation is a coefficient of variation for a group of method calls that reduces the variation in method call durations for processing method calls from an average method call duration for the method calls.

Each method call in the set of method call groups are identified by a method call identifier. The method calls are grouped together so that the coefficient of variation for processing each identified method call is minimized. In these examples, the cluster member method call groups are stored in database 614.

In order to reduce the coefficient of variation, the method call duration for each method call in a method call group should be very similar. The work load manager is made aware of the method call durations for all method calls associated with a given application running in the cluster environment. In one embodiment, the work load manager uses J2EE statistics and other WebSphere statistics methods to determine method call durations. In other words, the work load manager knows how the average time each method currently takes to execute in the cluster. The work load manager stores these average method call durations internally for retrieval when needed, such as in database 614.

Work load manager 600 receives application method calls from the set of clients. As used herein, a set of clients includes a single client, as well as two or more clients. Work load manager 600 places the received method call into a queue on the work load manager. The queue is a first-in first-out (FIFO) queue. Work load manager 600 looks up the method call name in the internal cluster member table.

Work load manager 600 uses the method call name to look up the method call group for that identified method call in a cluster member table. Work load manager 600 makes a determination as to which cluster member the method call should be sent to based upon the cluster member mapped to the identified method call in the cluster member table. Work load manager sends the queued method call to the predetermined cluster member for processing.

Work load manager 600 continues to take timings for method durations of method call processing after initiation of the method variation minimization. Work load manager 600 continues to track method durations during processing of method calls. If work load manager determines that the duration for processing a given method call is increasing beyond a threshold amount, for example, because the method call has become more input/output intensive, the work load manager will determine whether the method calls should be re-grouped into new method call groups. If work load manager determines that the method calls should be re-grouped, each method call is reassigned to a new method call group. Work load manager 600 then remaps each method call to a cluster member.

In other words, continues to take method call duration timings during processing of method calls. Based on these new timings for processing method calls, work load manager 600 determines an updated average method call duration corresponding to each call for a method associated with the application on the server cluster to form an updated average method call duration. Work load manager 600 re-groups the method to a different group of methods in the plurality of grouped methods based on the updated average method call duration.

In an alternative embodiment, if work load manager 600 determines that a given method call duration has increased beyond a predetermined threshold amount, work load manager 600 dynamically reassigns the given method call to a different method call group without re-grouping every other method call associated with the application. In this case, only the given method call with the increased method call duration is re-grouped and remapped to a different cluster member. Likewise, a set of two or more method calls can be re-grouped and remapped as required by work load manager to maintain an optimum coefficient of variation across the server cluster.

In accordance with another illustrative embodiment, two or more work load managers can be utilized to receive method calls and route the method calls to cluster members. In accordance with this embodiment, the set of two or more work load managers would require a network connection or other communication link to enable the set of work load managers to ensure that the internal method call duration table is in sync between all the work load managers in the set of work load managers. The multiple work load managers would communicate with each other to ensure that their own cluster member table was always in sync with the cluster member tables for the other work load managers. The work load managers would also share method duration information and average method durations for the plurality of method calls associated with an application executing on the server cluster. For example, if a server cluster had two work load managers, the first work load manager, WLM-1, would share method duration information stored in database 614 for each method call with the second work load manager, WLM-2. The multiple work load managers would share this information to create accurate method call groups for mapping method calls to cluster members.

In this illustrative example, work load manager 600 is located on a separate physical server machine from cluster members 614-620. However, in accordance with another illustrative embodiment, work load manager 600 is located on the same physical server machine as one or more cluster members.

In accordance with this illustrative example, work load manager takes timings to determine an average duration of each method call associated with the application running on the cluster environment. Work load manager 600 only takes timings while cluster members are not stressed. In other words, work load manager 600 takes timings to determine the average duration for processing a given method call when the cluster is not operating under heavy utilization, such as during a peak utilization time. When the cluster utilization begins to increase beyond a predetermined point, work load manager 600 stops taking timings.

The work load manager determines an average duration for each method call in a set of method calls that can be made on the application running in the cluster environment. Each method call in the set of method calls is identified by a name or identifier. For example, in an email application, a method call to access emails in an inbox can be identified as method call A, a method call to access a functionality to send an email to a recipient can be identified as method call B, and so forth.

Thus, in this example, the work load manager identifies a call for a method received from a client to form an identified call for a method. The work load manager determines a duration for processing the identified call for the method on the server cluster. The work load manager then records the average duration for processing the identified call for the method in a database to form an average method call duration corresponding to the identified call for the method. An average duration is determined by averaging one or more values recorded for the duration corresponding to the identified call for the method.

The work load manager creates a group of method calls for each cluster member in the set of cluster members associated with the application server cluster. Each group of method calls includes a set of identifiers identifying one or more method calls. Thus, if there are two cluster members and five possible method calls, the work load manager will group the five method calls into two method call groups in accordance with a grouping that will minimize the coefficient of variation for the method calls in each group. In this example, the work load manager could group method call A, method call C, and method call D in one group. The work load manager could then create a second group including method call B and method call E.

The work load manager predetermines which cluster server will receive a given group of method calls. In this example, the work load manager will decide arbitrarily which groups of method calls that minimize the coefficient of variation across method calls will be sent to which cluster member. This decision can be arbitrary because all cluster members are approximately equal in this example.

In other words, if the work load manager creates two groups of method calls, the work load manager will arbitrarily determine that group one with the lowest coefficient of variation will be sent to cluster member 1 and group two with the second lowest coefficient of variation will be sent to cluster member 2. Likewise, the workload manager could arbitrarily have determined that group one would be sent to cluster member 2 and group two would be sent to cluster member 1 with the same result.

In this illustrative example, a method variation minimization approach is utilized to route method calls to all cluster members associated with the server cluster. In this example, a method call group is assigned to every cluster member in the server cluster, including each of cluster member 616-622. However, in another illustrative example, work load manager 600 utilizes a round robin approach to route method calls to some cluster members and utilizes a method variation minimization approach to route method calls to other cluster members.

In this example, work load manager 600 has the ability to take a subset of cluster members in the server cluster and route method calls to cluster members in the subset of cluster members using the method variation minimization approach. The work load manager would continue to utilize the round-robin approach to route method calls to the remaining cluster members in the server cluster. In this example, a method call group is not assigned to every cluster member. Moreover, method calls are only mapped to cluster members in the subset of cluster members.

For example, if a server cluster includes four (4) cluster members and work load manager 600. If work load manager 600 identifies a method call group with average method call duration that runs extremely fast and a method call group with average method call duration that runs extremely slow, work load manager 600 can determine that the most efficient way of handling all method calls is to initiate a method variation minimization approach in two cluster members and utilize a round-robin approach in the remaining two cluster members.

In this illustrative example, cluster members 616-622 form a set of servers. The set of servers are connected to a set of clients. In this example, the set of servers includes four servers. However, in accordance with the illustrative embodiments, the set of servers can include only two servers, as well as three or more servers.

In accordance with another illustrative embodiment, work load manager 600 can detect when a cluster member goes offline. In response to detecting a cluster member that has gone off-line, work load manager 600 re-groups the set of method call groups to compensate for the off-line cluster member.

Figure 7:
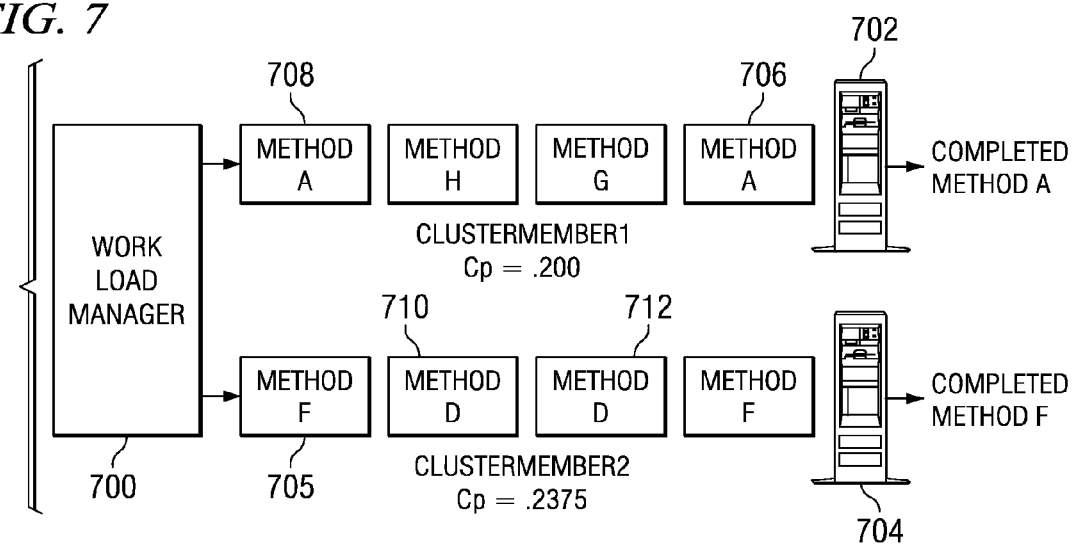
FIG. 7 is a block diagram of a cluster member usage in a server cluster in accordance with an illustrative embodiment.

Turning now to FIG. 7, a block diagram of a cluster member usage in a server cluster is shown in accordance with an illustrative embodiment. Work load manager 700 uses the average method duration data for the set of method calls associated with the application running in the cluster to group the method calls to each cluster member. The method calls are grouped in order to minimize the coefficient of variation on each cluster member. Work load manager 700 uses the data to compute the most efficient way of reducing the coefficient of variation on each cluster member. Work load manager 700 keeps an internal map of which method call identifier should map to which cluster member. Work load manager 700 routes each method call received from a client to the specific cluster member mapped to that method call identifier. In this manner, the coefficient of variation on each cluster member can be maintained at an optimal coefficient of variation.

Work load manager 700 computes the most optimized way of reducing the coefficient of variation across the cluster members. In this example, there are only two cluster members. Work load manager 700 groups the method calls as follows:

Cluster member 702—MethodA, MethodH, MethodG.
Cluster member 704—MethodF, MethodD.

In this example, work load manager 700 assignes the method call group including identifiers for method call A, method call H, and method call G, to cluster member 702. This grouping of method calls results in a first lowest coefficient of variation of only 0.200 in this example. Work load manager 700 assignes the second method call group, including the identifier for method call F and method call D, to cluster member 704. This second grouping has a second lowest coefficient of variation of only 0.2375. Thus, in both groupings of method calls, the coefficient of variation is lower than the coefficient of variation when a round-robin approach is used, such as in FIG. 3, where the coefficient of variation is 0.9756 at both cluster member 302 and cluster member 304.

In this example, when a client attempts to call Method call F 705 in the application running on the cluster environment, work load manager 700 looks up in its internal mapping of method call identifiers to cluster members. Work load manager 700 determines that method calls identified as Method F should route to cluster member 704.

In this example, work load manager 700 also receives method call A 706 and 708. Both instances of method call A 706 and 708 are sent to cluster member 702, regardless of whether cluster member 702 the work load manager receives method call D 710 and 712, from one or more users, both instances of method call D 710 and 712 are sent to cluster member 704.

Work load manager 700 reduces the coefficient of variation on each cluster member by grouping the method calls in this manner. By reducing the coefficient of variation on each cluster member, the wait time for each method call is also reduced.

Figure 8:
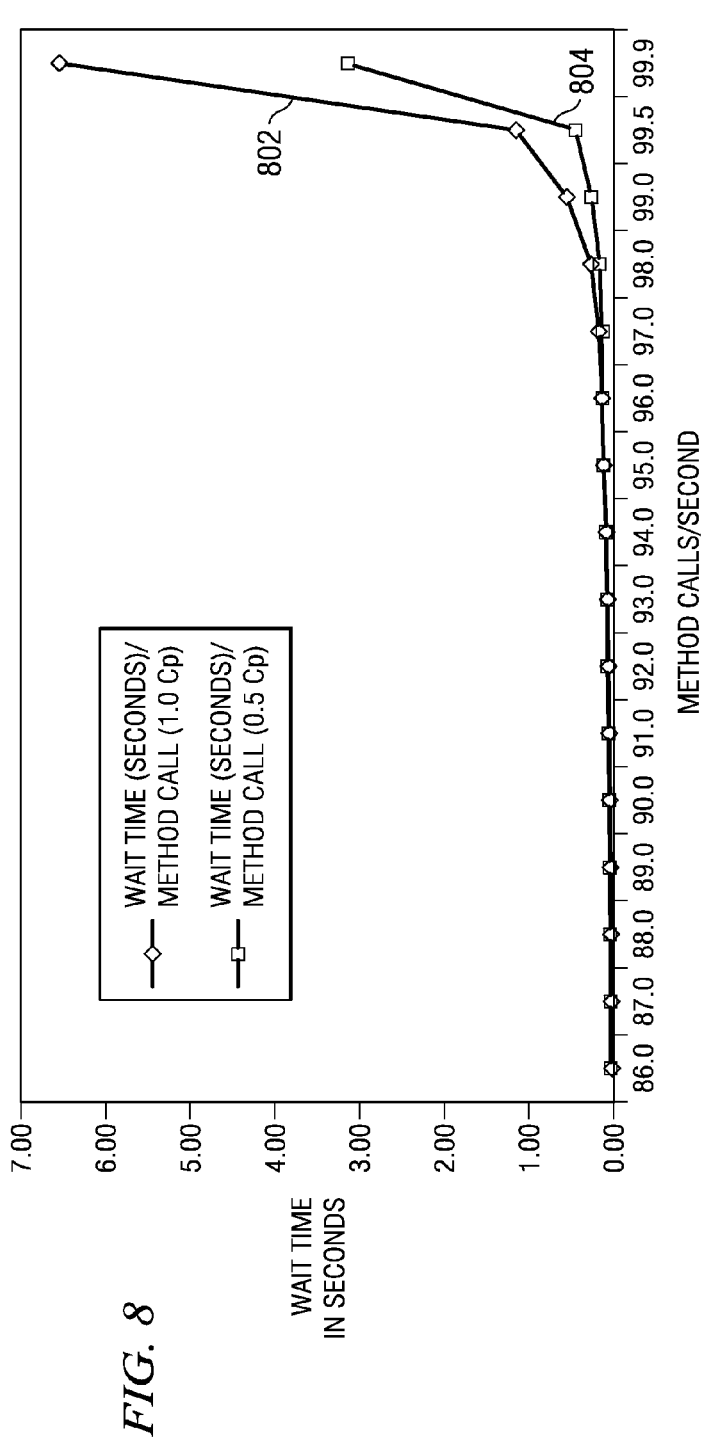
FIG. 8 is a graph diagram illustrating the wait time per method call where a work load manager implements a method variation minimization approach in accordance with an illustrative embodiment.

Turning now to FIG. 8, a graph diagram is depicted illustrating the wait time per method call where a work load manager implements a method variation minimization approach in accordance with an illustrative embodiment. In this example, graph line 802 is a graph line representing the wait time in seconds relative to the number of method calls received per second where a round robin approach is used to route method calls. Graph line 802 takes on a Poissan type of distribution. As can be seen, as the usage of the server cluster increases, the wait time also dramatically increases to almost 4 seconds.

Graph line 804 is a graph line representing the wait time in seconds relative to the number of method calls received per second where a method variation minimization approach is used in accordance with the illustrative embodiments. As can be seen, every variable remains the constant in both scenarios except for the coefficient of variation. In the round robin approach, the coefficient of variation is 1.0. In the method variation minimization approach, the coefficient of variation is 0.5, or half as much. Instead of a Poissan distribution, graph line 804 shows a duration of method call processing that takes on a more predictable pattern which will decrease the coefficient of variation. In addition, the wait time is dramatically decreased. Even at the highest utilization point on the graph, the wait time for graph line 804 does not reach 3.00 seconds. Therefore, using the method variation minimization approach produces increased efficiency and optimizes processing in the cluster.

Figure 9:
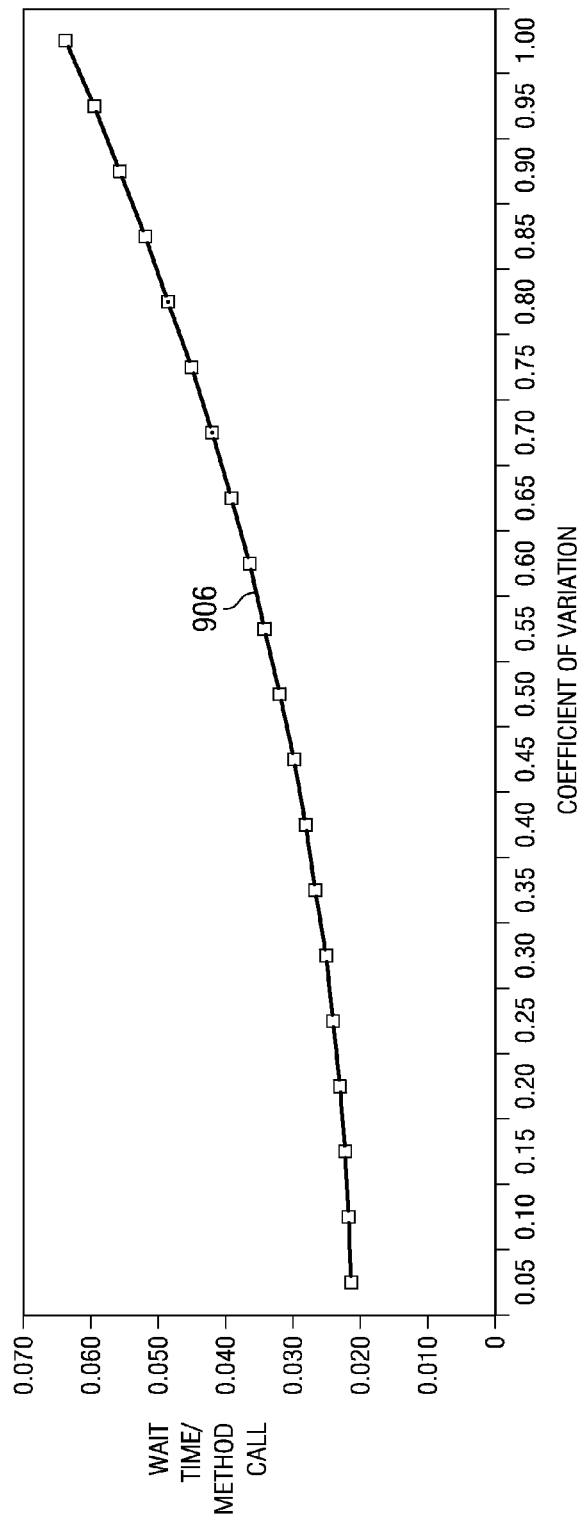
FIG. 9 is a graph diagram illustrating the wait time per method call where application server utilization is held constant in accordance with an illustrative embodiment.

Turning now to FIG. 9, a graph diagram is depicted illustrating the wait time per method call where application server utilization is held constant in accordance with an illustrative embodiment. In this example, the utilization rate of the cluster members is held constant at ninety-five (95) percent as shown in item 902. The coefficient of variation illustrated in the table at item 904 a variable with changing values. Graph line 906 on the graph illustrates that as the coefficient of variation increases, the wait time for processing a given method call increases. Likewise, the wait time per method call can be reduced by reducing the coefficient of variation of the method call duration. For example, by reducing the coefficient of variation from 1.0 to 0.4, the wait time of a method call can be reduced by 0.036 seconds. The decrease in the method calls duration represents a decrease of fifty-six (56) percent in the processing time for the given method call.

Thus, when all other factors are constant, reducing the coefficient of variation of the method duration time on an application server will reduce the wait time per method call in the entire process.

Reducing the coefficient of variation of method call duration on each cluster member can improve the overall performance of an entire cluster. The wait time is a factor of utilization rate of the cluster. Thus, during a heavy load on the cluster, the improvements in wait time become more noticeable. In other words, in times of heavy load, as the number of method calls being received increases, utilization of the method variation minimization approach for improving cluster performance will become more significant.

When the work load manager dispatches a method call to a cluster member, the work load manager looks up a mapping for the method call identifier to a cluster member in the internal table. The mapping in the internal table indicates the cluster member to which the method call should be routed. The work load manager utilizes a minimal amount of processing time to look up the method call mapping in the internal table. The processing time affects how long the method call duration lasts from the perspective of a client making the method call on the application.

Figure 10:
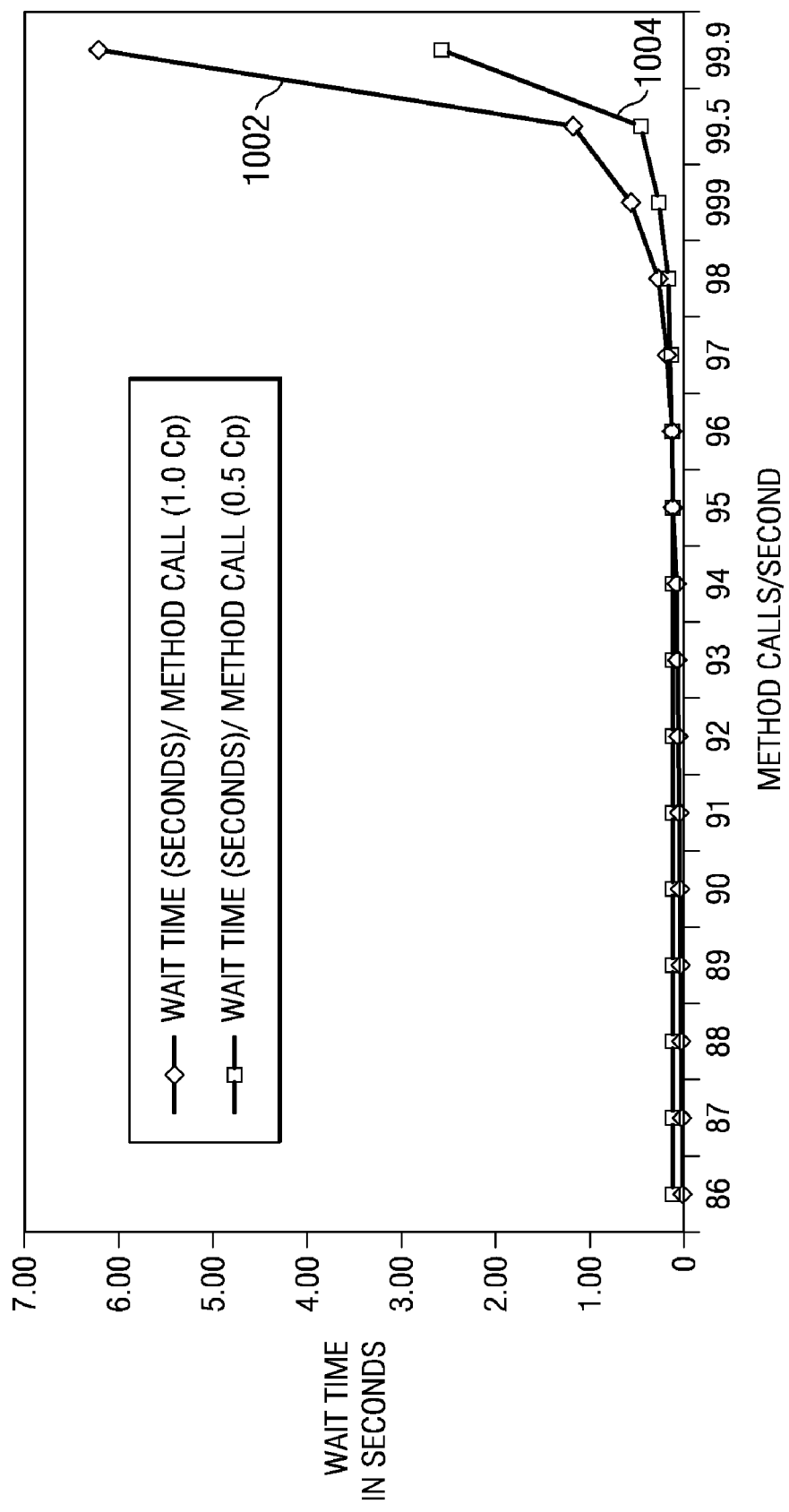
FIG. 10 is a graph diagram illustrating the wait time per method call from a client perspective in accordance with an illustrative embodiment.

Turning now to FIG. 10, a graph diagram is depicted illustrating the wait time per method call from a client perspective in accordance with an illustrative embodiment. In this example, we assume that each mapping lookup on the work load manager adds 0.1 seconds to the method call duration. This is a worst-case scenario. In this example, 0.1 seconds is added to the duration of every method call from the perspective of a user at a client.

In this example, we also assume that the maximum number of method calls that can be handled by the server cluster is one-hundred (100) method calls per second. Thus, in this example, when the server cluster received ninety-six (96) method calls per second, the server cluster utilization is at ninety-six (96) percent of the maximum utilization for the server cluster. However, this example is not intended to imply any restriction or limitation on the type of server cluster or the possible number of method calls any given server cluster may be capable of handling in accordance with the illustrative embodiments. The illustrative embodiments may be implemented in a server cluster capable of handling any given number of method calls per second.

Graph line 1002 illustrates a relationship between wait time in seconds and the number of method calls received per second using a round-robin approach. Graph line 1004 illustrates a relationship between wait time per second and the number of method calls received per second using a method variation minimization approach in accordance with the illustrative embodiments. Graph line 1004 shows that when cluster member utilization is less than approximately ninety-six (96) percent, utilization of the round-robin approach produces a lower wait time in seconds for a user at a client. Once utilization increases to ninety-six (96) percent or greater, the method variation minimization method produces a lower wait time in seconds for a user.

In this illustrative embodiment, a work load manager utilizes a round robin approach to route incoming method calls to cluster members when the work load manager determines that cluster utilization is at ninety-five (95) percent or less. In this example, when the work load manager determines that cluster utilization has increased to ninety-six (96) percent or greater, the work load manager switches to a method variation minimization approach for routing method calls to cluster member in order to optimize cluster performance.

However, a work load manager is not limited to switching to a method variation minimization approach only when utilization reaches ninety-six (96) percent. In accordance with the illustrative embodiment, a work load manager can switch from a round-robin approach to a method variation minimization approach at any determined utilization level. For example, a work load manager could switch to a method variation minimization approach when utilization reaches ninety-five (95) percent. Likewise, the work load manager could wait until utilization increases to ninety-seven (97) percent prior to initiating a method variation minimization approach.

Thus, in accordance with this embodiment, a server cluster includes a plurality of grouped methods. When a work load manager receives a call for a method in the plurality of grouped methods, the work load manager determines whether a utilization of the server cluster has reached a threshold utilization. When a utilization of a server cluster reaches the threshold utilization, such as ninety-six (96) percent, the work load manager stops using a round-robin approach to route method calls and switches to a method variation minimization approach, in accordance with the illustrative embodiments of the present invention.

In other words, the work load manager routes the received call for the method to a selected cluster member that is mapped to the method in the plurality of grouped methods for execution of the method, in accordance with the method variation minimization approach. Each method call is mapped to a selected cluster member based on the plurality However, in response to determining that a threshold utilization of the server cluster has not been reached, the work load manager routes the received call for the method to a least recently used cluster member in the server cluster for execution of the method, in accordance with the round-robin approach of routing method calls.

In accordance with another illustrative example, the work load manager takes timings of method call processing to determine average method call duration during low utilization periods when a round-robin approach is utilized. In this example, when utilization of the cluster exceeds a threshold point, such as ninety-five (95) percent utilization, the work load manager ceases to take timings, stops calculating average method call durations, and switches from a round-robin approach to a method variation minimization approach to routing method calls to cluster members.

Turning now to FIG. 11, a flowchart of an operation occurring when a work load manager receives a method call is depicted in accordance with an illustrative embodiment. In this illustrative example, the process is implemented by a work load manager, such as work load manager 600 in FIG. 6.

The process begins with the work load manager making a determination as to whether to initiate the method variation minimization approach to routing method calls (step 1100). In this example, if the work load manager determines that server cluster utilization is at ninety-five (95) percent or less, the work load manager will determine that method variation minimization should not be initiated. The work load manager sends the next received method call to the least recently used cluster member, in a round-robin approach to routing method calls (step 1102) with the process terminating thereafter.

Returning to step 1100, if the work load manager determines that server cluster utilization is greater than a threshold, such as ninety-five (95) percent, the work load manager will determine that method variation minimization should be initiated. The work load manager looks up the average method duration for each application method for the application running in the cluster environment (step 1104). The work load manager groups methods to form "n" groups, where "n" is the number of cluster members such that the method variation at each cluster member is minimized (step 1006). The work load manager maps each method call identifier in each group to the cluster member associated with that method call group to form a cluster member table (step 1108).

The work load manager receives a method call from a client (step 1110). The work load manager looks up the method call identifier in the cluster member table (step 1112). The work load manager sends the method call to the optimal cluster member identified in the cluster member table (step 1114). The work load manager makes a determination as to whether the work load manager has received an additional method call (step 1116). If an additional method call has been received, the process returns to step 1112 where the work load manager will lookup a predetermined cluster member mapped to the received method call identifier to determine to which cluster member the additional method call should be routed. If work load manager determines that an additional method call has not been received, the process terminates thereafter.

Turning now to FIG. 12, a flowchart of an operation occurring when a work load manager determines average method call duration is shown in accordance with an illustrative embodiment. In this illustrative example, the process is implemented by a work load manager, such as work load manager 600 in FIG. 6.

The process begins with the work load manager receiving a method call (step 1202). The work load manager determines a duration for processing the method call in the server cluster (step 1204). The work load manager calculates an average method duration for the method call (step 1206). The work load manager records the average method duration time in an internal method duration table (step 1208).

The work load manager makes a determination as to whether the work load manager received another method call (step 1210). If the work load manager received another method call, the work load manager returns to step 1204 and determines a duration for processing the newly received method call. If the work load manager determines that another method call is not received, the process terminates thereafter.

Thus, the illustrative embodiments provide computer implemented method, apparatus, and computer usable program code for a method variation minimization approach to minimize the coefficient of variation in an application server cluster. By reducing the coefficient of variation on the duration of processing a given method call in the cluster, the wait time for processing the method call can be reduced. Therefore, utilization of a method variation minimization approach permits optimization of cluster performance by reducing the duration of processing each method call in the cluster.

The flowchart and block diagrams in the figures illustrate the architecture, functionality, and operation of possible implementations of methods, apparatus, and computer program products according to various embodiments of the present invention. In this regard, each block in the flowchart or block diagrams may represent a module, segment, or portion of code, which comprise one or more executable instructions for implementing the specified logical function(s). It should also be noted that in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a server cluster, the computer implemented method comprising:
    determining whether a utilization of the server cluster has reached a threshold utilization;
    responsive to determining that the utilization of the server cluster has reached the threshold utilization, determining a wait time of a plurality of method calls received on the server cluster by performing a calculation utilizing a coefficient of variation, wherein the coefficient of variation measures a deviation between average processing time and actual processing time for the method call;
    identifying a plurality of average method call durations corresponding to the plurality of method calls to form a plurality of identified average method call durations;
    grouping the plurality of method calls into a plurality of groups based on the plurality of identified average method call durations to form a plurality of grouped methods, wherein the coefficient of variation on each cluster member in the server cluster is reduced as a result of grouping the plurality of method calls into the plurality of grouped methods, wherein a duration associated with each method call is substantially the same for the each method call included in each group;
    assigning a particular cluster member in the server cluster for the each group in the plurality of grouped methods; and
    responsive to receiving a call for a method in the plurality of method calls, executing the method on an assigned cluster member for the method based on a group for the method.

2. The computer implemented method of claim 1, wherein the method calls comprise requests for at least one function of an application located on a cluster member in the server cluster.

3. The computer implemented method of claim 1 wherein the threshold utilization is an indication that the server cluster is under a heavy workload, wherein the heavy workload occurs when a number of method calls received over a period of time increases above a certain point and the utilization of cluster members in the server cluster reaches a threshold percentage level.

4. The computer implemented method of claim 1 further comprising:
    responsive to determining that the threshold utilization of the server cluster has not been reached, routing the method to a least recently used cluster member in the server cluster for execution of the method.

5. The computer implemented method of claim 1 wherein the determination whether the utilization of the server cluster has reached the threshold utilization is determined by a workload manager, wherein the workload manager is a software component in the server cluster that manages cluster members associated with the server cluster.

6. The computer implemented method of claim 5, wherein the each group from the plurality of groups comprises one or more method call identifiers, wherein the workload manager uses the one or more method call identifiers to route the method to the assigned cluster member.

7. The computer implemented method of claim 1, wherein the wait time is a calculation of an average duration for each method call associated with a given application on the server cluster.

8. The computer implemented method of claim 5 wherein the determination of the wait time is performed by the workload manager when the server cluster is not operating under the heavy workload.

9. The computer implemented method of claim 1 wherein a call for the method is mapped to a cluster member that corresponds to an optimum coefficient of variation for processing the method in the server cluster.

10. The computer implemented method of claim 9 further comprising:
    identifying the call for the method received from a client to form an identified call for the method;

determining the duration for processing the identified call for the method on the server cluster; and recording the average duration for processing the identified call for the method in a database to form an average method call duration corresponding to the identified call for the method.

11. The computer implemented method of claim 5 further comprising:

determining an updated average method call duration corresponding to the call to the method associated with the application on the server cluster to form an updated average method call duration; and re-grouping the method to a different group of methods in the plurality of grouped methods based on the updated average method call duration, wherein the workload manager determines that the method is sent to a different cluster member than a previously identified cluster member based on the updated average.

12. The computer implemented method of claim 1, wherein the wait time for a method call in the server cluster is calculated utilizing a calculation, wherein the calculation is $$\text{WAIT TIME} = \frac{\frac{p^{\sqrt{2c+1}}}{1-p} \times \frac{\left(\frac{C_i}{\sqrt{c}}\right)^2 + C_p^2}{2}}{R}$$

, wherein p is a utilization rate of cluster members in the server cluster, c is a number of the cluster members in the server cluster, Ci is a coefficient of variation of an arrival rate of incoming method calls, C~. is the coefficient of variation of the duration for processing the method call, and R is a flow rate of each cluster member.

13. An apparatus for managing a server cluster, the apparatus comprising:

a set of servers, wherein the set of servers are connected to a set of clients via a network connection;

a storage device connected to a bus, wherein the storage device contains a computer usable program product; and a processor, wherein the processor unit executes the computer usable program code:

to determine whether a utilization of the server cluster has reached a threshold utilization;

determining a wait time of a plurality of method calls received on the server cluster by performing a calculation utilizing a coefficient of variation, wherein the coefficient of variation measures the deviation between average processing time and actual processing time for the method call;

identifying a plurality of average method call durations corresponding to the plurality of method calls to form a plurality of identified average method call durations;

grouping the plurality of method calls into a plurality of groups based on the plurality of identified average method call durations to form a plurality of grouped methods, wherein the coefficient of variation on each cluster member in the server cluster is reduced as a result of grouping the plurality of method calls into the plurality of grouped methods, wherein a duration associated with each method call is substantially the same for the each method call included in each group;

assigning a particular cluster member in the server cluster for the each group in the plurality of grouped methods; and responsive to receiving a call for a method in the plurality of method calls, executing the method on an assigned cluster member based on the group for the method.

14. A computer program product stored on a non-transitory computer readable medium for managing a server cluster, the computer program product comprising:

computer usable program code for determining whether a utilization of the server cluster has reached a threshold utilization;

computer usable program code for determining a wait time of a plurality of method calls received on the server cluster by performing a calculation utilizing a coefficient of variation, wherein the coefficient of variation measures the deviation between average processing time and actual processing time for the method call;

computer usable program code for identifying a plurality of average method call durations corresponding to the plurality of method calls to form a plurality of identified average method call durations;

computer usable program code for grouping the plurality of method calls into a plurality of groups based on the plurality of identified average method call durations to form a plurality of grouped methods, wherein the coefficient of variation on each cluster member in the server cluster is reduced as a result of grouping the plurality of method calls into the plurality of grouped methods, wherein a duration associated with each method call is substantially the same for the each method call included in each group;

computer usable program code for assigning a particular cluster member in the server cluster for the each group in the plurality of grouped methods; and computer usable program code for responsive to receiving a call for a method in the plurality of method calls, executing the method on an assigned cluster member based on a group for the method.

15. The computer program product of claim 14, wherein the method calls comprise requests for at least one function of an application located on a cluster member in the server cluster.

16. The computer program product of claim 14 wherein the threshold utilization is an indication that the server cluster is under a heavy workload, wherein the heavy workload occurs when a number of method calls received over a period of time increases above a certain point and the utilization of cluster members in the server cluster reaches a threshold percentage level.

17. The computer program product of claim 14 further comprising:

computer usable program code for routing the method to a least recently used cluster member in the server cluster for execution of the method in response to determining that the threshold utilization of the server cluster has not been reached.

18. The computer program product of claim 14, wherein the determination whether the utilization of the server cluster has reached the threshold utilization is determined by a workload manager, and wherein the workload manager is a software component in the server cluster that manages cluster members associated with the server cluster.

19. The computer program product of claim 18, wherein the each group from the plurality of groups comprises one or more method call identifiers, wherein the workload manager uses the one or more method call identifiers to route the method to the corresponding cluster member.

20. The computer program product of claim 14 wherein a call for the method is mapped to a cluster member that corresponds to an optimum coefficient of variation for processing the method in the server cluster.

* * * * *